US007816472B2

(12) United States Patent
Cernohous et al.

(10) Patent No.: US 7,816,472 B2
(45) Date of Patent: Oct. 19, 2010

(54) POLYDIACETYLENE POLYMER COMPOSITIONS AND METHODS OF MANUFACTURE

(75) Inventors: Jeffrey J. Cernohous, Hudson, WI (US); Steven D. Koecher, New Brighton, MN (US); Richard G. Hansen, Mahtomedi, MN (US); G. Marco Bommarito, Stillwater, MN (US)

(73) Assignee: 3m Innovative Properties Company, St. Paul, MN (US)

( * ) Notice: Subject to any disclaimer, the term of this patent is extended or adjusted under 35 U.S.C. 154(b) by 494 days.

(21) Appl. No.: 10/922,092

(22) Filed: Aug. 19, 2004

(65) Prior Publication Data

US 2006/0041099 A1    Feb. 23, 2006

(51) Int. Cl.
C08F 38/02 (2006.01)
(52) U.S. Cl. .............. 526/285; 428/355 N; 428/423.1; 428/500; 522/150; 522/152; 522/153; 522/154; 522/162; 522/173; 522/174; 522/178; 522/182; 524/590; 524/591; 524/839; 524/840; 528/59; 528/75; 528/76
(58) Field of Classification Search .................. 528/59, 528/75, 76, 905; 428/423.1, 355 N, 500; 524/590, 591, 839, 840; 522/150, 152, 153, 522/154, 162, 173, 174, 178, 182; 526/285, 526/931
See application file for complete search history.

(56) References Cited

U.S. PATENT DOCUMENTS

| 3,709,860 | A | 1/1973 | Fischer et al. ............. 260/77.5 |
| 3,999,946 | A | 12/1976 | Patel et al. ..................... 23/253 |
| 4,215,208 | A | 7/1980 | Yee et al. ...................... 526/285 |
| 4,238,352 | A | 12/1980 | Patel et al. .................... 252/408 |
| 4,242,440 | A | 12/1980 | Yee et al. ...................... 430/346 |
| 4,389,217 | A | 6/1983 | Baughman et al. ............. 436/2 |
| 4,708,019 | A | 11/1987 | Rubner et al. ................. 73/760 |
| 4,721,769 | A | 1/1988 | Rubner ......................... 528/75 |
| 4,767,826 | A | 8/1988 | Liang et al. .................. 525/421 |
| 4,849,500 | A | 7/1989 | Rubner ......................... 528/345 |
| 4,916,211 | A | 4/1990 | Rubner ......................... 528/480 |
| 5,156,810 | A | 10/1992 | Ribi ......................... 422/82.01 |
| 5,491,097 | A | 2/1996 | Ribi et al. .................... 436/518 |
| 5,554,686 | A | 9/1996 | Frisch, Jr. et al. ........... 524/588 |
| 5,571,568 | A | 11/1996 | Ribi et al. .................... 427/487 |
| 5,622,872 | A | 4/1997 | Ribi ........................... 436/518 |
| 5,672,465 | A | 9/1997 | Patel et al. ................... 430/332 |
| 5,685,641 | A | 11/1997 | Ribi ........................... 374/162 |
| 5,692,937 | A | 12/1997 | Zhang ......................... 442/149 |
| 5,929,160 | A | 7/1999 | Krepski et al. ............... 524/590 |
| 6,103,217 | A | 8/2000 | Charych .................... 424/9.321 |
| 6,518,359 | B1 | 2/2003 | Clemens et al. .............. 524/840 |
| 6,607,744 | B1 | 8/2003 | Ribi ........................... 424/439 |
| 6,642,304 | B1 | 11/2003 | Hansen et al. ............... 524/590 |
| 6,963,007 | B2 | 11/2005 | Hays et al. ................... 558/333 |
| 7,371,511 | B2 | 5/2008 | Koecher et al. | |
| 2004/0126897 | A1 | 7/2004 | Prince et al. ................. 436/518 |
| 2004/0132217 | A1 | 7/2004 | Prince et al. ................. 436/518 |
| 2005/0137375 | A1 | 6/2005 | Hansen et al. ................ 528/44 |
| 2006/0041057 | A1 | 2/2006 | Koecher et al. .............. 525/50 |
| 2006/0134796 | A1 | 6/2006 | Bommarito et al. ......... 436/166 |

FOREIGN PATENT DOCUMENTS

| DE | 36 13 492 | 10/1987 |
| WO | WO 96/25665 A1 | 8/1996 |
| WO | WO 97/27316 A1 | 7/1997 |
| WO | WO 98/04743 A1 | 2/1998 |
| WO | WO 98/36263 A1 | 8/1998 |
| WO | WO 98/39632 A1 | 9/1998 |
| WO | WO 99/10743 A1 | 3/1999 |
| WO | WO 99/67423 A1 | 12/1999 |
| WO | WO 02/00920 A2 | 1/2002 |

OTHER PUBLICATIONS

Mino, N. et al.; "Photoreactivity of 10,12-Pentacosadiynoic Acid Monolayers and Color Transitions of the Polymerized Monolayers on an Aqueous Subphase"; Langmuir 1992, vol. 8, p. 594-598.

Chance, R.R. et al.; "Thermal effects on the optical properties of single crystals and solution-cast films of urethane substituted polydiacetylenes"; J. Chem. Phys. vol. 71(1), Jul. 1, 1979, p. 206-211.

Shibata, M.; "Reversible Colour Phase Transitions and Annealing Properties of Langmuir-Blodgett Polydiacetylene Films"; Thin Solid Films; vol. 179 (1989) p. 433-437.

Kaneko, F. et al.; "Absorption properties and structure changes caused by pre-annealing in polydiacetylene Langmuir-Blodgett films"; Thin Solid Films; vol. 210/211 (1992) p. 548-550.

Rubner, M.F.; "Synthesis and Characterization of Polyurethane-Diacetylene Segmented Copolymers"; Macromolecules 1986, vol. 19, p. 2114-2128.

Rubner, M.F.; "Novel Optical Properties of Polyurethane-Diacetylene Segmented Copolymers"; Macromolecules 1986; vol. 19, p. 2129-2138.

Nallicheri, R.A. et al.; "Thermal and Mechanical Properties of Polyurethane-Diacetylene Segmented Copolymers. 1. Molecular Weight and Annealing Effects"; Macromolecules 1990; vol. 23, p. 1005-1016.

Nallicheri, R.A. et al.; "Thermal and Mechanical Properties of Polyurethane-Diacetylene Segmented Copolymers. 2. Effects of Diacetylene Cross-Polymerization"; Macromolecules 1990; vol. 23, p. 1017-1025.

(Continued)

Primary Examiner—John Cooney

(57) ABSTRACT

Polyurethane-based polymer compositions that include diacetylene segments are provided.

39 Claims, No Drawings

OTHER PUBLICATIONS

Hammond, P.T. et al.; "Thermochromism in Liquid Crystaline Polydiacetylenes"; Macromolecules 1997; vol. 30, p. 5773-5782.

Oertel, G. (Editor); "Polyurethane, Kunststoff Handbuch 7"; 1983; p. 22-24.

Zorll, U. (Editor); "RÖMPP Lexikon—Lacke und Druckfarben"; 1998; p. 467.

Siemsen, P. et al.; "Acetylenic Coupling: A Powerful Tool in Molecular Construction"; Angewandte Chemie International Edition; 2000; vol. 39 (15); p. 2632-2657.

Valverde, C. et al.; "Some Novel Photosensitive Diactylene Diurethanes and Their Mixtures in Common Polymers"; Polymers for Advanced Technologies; vol. 7, pp. 27-30 (1996).

Miller, J.A. et al.; "Properties of Polyether-Polyurethane Block Copolymers: Effects of Hard Segment Length Distribution"; Macromolecules; 1985; vol. 18, pp. 32-44.

POLYDIACETYLENE POLYMER COMPOSITIONS AND METHODS OF MANUFACTURE

BACKGROUND

Polymer compositions that include polydiacetylene segments are used for a variety of applications. Diacetylenes are typically colorless and undergo addition polymerization, either thermally or by actinic radiation. As the polymerization proceeds, these compounds undergo a contrasting color change, typically from colorless to blue or purple. Furthermore, when exposed to external stimuli such as heat, physical stress or a change of solvents or counterions, polydiacetylenes exhibit further color changes produced by distortion of the planar backbone conformation. Polydiacetylene assemblies are known to change color from blue to red with an increase in temperature or changes in pH due to conformational changes in the conjugated backbone as described in Mino, et al., Langmuir, Vol. 8, p. 594, 1992; Chance, et al., Journal of Chemistry and Physics, Vol. 71, 206, 1979; Shibutag, Thin Solid Films, Vol. 179, p. 433, 1989; Kaneko, et al., Thin Solid Films, Vol. 210, 548, 1992; and U.S. Pat. No. 5,672,465. Utilization of this class of compounds is known for use as biochromic indicators as discussed in U.S. Pat. No. 5,622,872 and publication WO 02/00920.

In addition to the polymerization of monomeric diacetylenes, it has been demonstrated that the diacetylene functionality can be incorporated in the repeat structure of a polymer backbone. These types of polymers undergo solid-state cross-polymerization on exposure to U.V. radiation, and form, polydiacetylene chains. These materials have been referred to as macromonomers due to the systematic polymerization of the diacetylene units within the backbone structure of the initial polymer. Examples of polymers containing the reactive diacetylene functionality in the repeat structure of the polymer backbone formed by linking the appropriate difunctional monomers together, wherein one of the difunctional monomers contains the diacetylene group, include the diacetylene-urethane copolymers described in U.S. Pat. Nos. 4,215,208 and 4,242,440; segmented copolymers formed from diisocyanate reacted with elastomeric prepolymer and chain extended with a diacetylene described in U.S. Pat. No. 4,721,769; linear block copolymers with a soft segment (polyether, polyester, polydiene, polydimethylsiloxane) and a diacetylene-containing hard segment (polyurethane, polyamide, polyester, polyurea) as described in U.S. Pat. No. 4,767,826; and polyamide-diacetylene copolymers as described in U.S. Pat. Nos. 4,849,500 and 4,916,211.

SUMMARY

The present invention is directed to polymer compositions, articles comprising the polymer compositions, and methods of making and using the compositions, wherein the compositions include diacetylene-containing polymer comprising the reaction product of an isocyanate-reactive component; a diacetylene-containing isocyanate-reactive component; an isocyanate-functional component; a reactive emulsifying compound; an optional catalyst; and an optional chain extending agent.

In one embodiment, the isocyanate-reactive component and the diacetylene-containing isocyanate-reactive component comprises a hydroxyl-functional material, such as a polyol. In some embodiments, the diacetylene-containing isocyanate reactive material comprises about 2 percent by weight based on the total weight of polymer.

In one embodiment, the isocyanate-functional component comprises a diisocyanate.

In one embodiment, the reactive emulsifying compound is represented by the formula V:

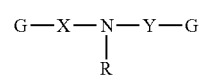

(V)

wherein G is selected from the group consisting of OH, NHR and SH; each of X and Y may be the same or different; each of X and Y are independently selected from aliphatic organic radicals having from about 1 to about 20 carbon atoms, free of reactive functional groups, and combinations thereof; and R can be hydrogen or an aliphatic organic radical having from about 1 to about 20 carbon atoms, free of reactive functional groups.

In another embodiment, the reactive emulsifying compound is represented by the formula IV:

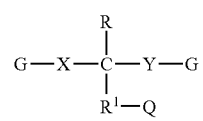

(IV)

wherein G is selected from the group consisting of OH, NHR and SH; Q is a negatively charged moiety selected from COO$^-$ and SO$_3^-$, or a group that is capable of forming such a negatively charge moiety upon ionization; X, Y, and R$^1$ may be the same or different; X, Y, R, and R$^1$ are independently selected from aliphatic organic radicals free of reactive functional groups, preferably having from about 1 to about 20 carbon atoms, and combinations thereof; R can be hydrogen; and R$^1$ is optional if Q is COO$^-$ and SO$_3^-$.

In most embodiments, the polymer composition is chromogenic. In one embodiment, the cured polymer composition exhibits a secondary chromogenic response when exposed to an external stimuli.

As used herein, "a," "an," "the," "at least one," and "one or more" are used interchangeably. Also herein, the recitations of numerical ranges by endpoints include all numbers subsumed within that range (e.g., 1 to 5 includes 1, 1.5, 2, 2.75, 3, 3.80, 4, 5, etc.).

The above summary of the present invention is not intended to describe each disclosed embodiment or every implementation of the present invention. The description that follows more particularly exemplifies illustrative embodiments.

DETAILED DESCRIPTION OF ILLUSTRATIVE EMBODIMENTS OF THE INVENTION

The present invention provides polymer compositions that include diacetylene segments. In particular, the present invention is directed to polymers containing diacetylene segments to provide a polymer network capable of a calorimetric indication in response to stimuli, such as heat, an analyte or exposure to certain environmental factors.

The diacetylene segments self assemble to form ordered assemblies that can be polymerized using any actinic radiation such as, for example, electromagnetic radiation in the UV or visible range of the electromagnetic spectrum. The ability of the diacetylene segments to self-assemble into ordered assemblies allows the polymerization to proceed topochemically. The self-assembly of diacetylenes depends in large part on two factors: the molecular architecture of the diacetylene starting materials, and the nature of the copolymer segment. The diacetylene starting materials of this invention are designed to have a molecular architecture which not only enhances but directs their ability to self-assemble, by providing an "engineered" intermolecular affinity for the diacetylene molecules to aggregate into ordered assemblies. An example of a copolymer segment for the diacetylene materials is a polyurethane polymer system that contributes to the self-assembly of the diacetylenes by providing a hydrogen bonding template for the formation of ordered assemblies of diacetylenes.

While not wishing to be bound by theory, it is believed that the diacetylene-containing polymers exhibit a color development based on the propensity of the copolymer to self-assemble at the molecular level into ordered morphologies. Consequently, the diacetylene moieties contained within the polymer backbone are aligned to such a degree that cross-linking can occur across the diacetylene functionality, resulting in a conjugated network. The ensuing observed color development can be a direct indication of the degree of conjugation that exists in a particular system. The cross-linked diacetylene in the polymer network provides two material attributes that are desirable in many applications: 1) enhanced integrity, 2) a color development.

Polymerization of the diacetylene components result in polymerization reaction products that have a color in the visible spectrum, i.e., in the wavelength between 400 nm and 600 nm of varying intensity as measured by chroma ($C^*$) and hue as measured by hue angle ($h°$) depending on their conformation and exposure to external factors. $L^*$, $C^*$ and $h°$ are measurements that can be used to quantify the observed colors and to monitor consistency. $L^*$ is the lightness of the color on a scale from 0, or pure black, to 100, or pure white. $C^*$ (chroma) is the saturation or a measure of the intensity of a particular hue or observed color. Chroma may also be defined more formally as the distance of departure of a chromatic color from the neutral (gray) color of the same value. The chroma scale begins at zero, but has no arbitrary end. As the $C^*$ value increases, the relative saturation also increases. Hue ($h°$) represents the hue angle of the color represented and ranges from 0° to 360°.

Polymers containing diacetylene components can exhibit a reversible color change and/or a three state color change. For example, after polymerization the resulting blue-phase polymer network can change color to a reddish-orange state upon exposure to heat, a change in solvent or counterion, or physical stress. This reddish-orange polymer network can then change color to a yellowish-orange state upon further exposure to heat, a change in solvent or counterion, or physical stress. Additionally, polymer networks disclosed herein can cycle between these reddish-orange and yellowish-orange states in a reversible manner.

The ability of polydiacetylene-containing polymers to undergo a visible color change upon exposure to a variety of elements, including ultraviolet light, physical stress, a change in solvent and a change in counter ion, for example, make them ideal candidates for the preparation of various sensing devices. Such sensing devices can employ the diacetylene-containing polymers in solution or in their solid state.

The structural requirements of diacetylenic polymer for a given sensing application are typically application specific. Features such as overall chain length, solubility, polarity, crystallinity, and the presence of functional groups for further molecular modification all cooperatively determine a diacetylene-containing polymer's ability to serve as a useful sensing material.

The diacetylene compounds can be easily and efficiently polymerized into polydiacetylene-containing polymers that develop a color, such as blue or purple, as the polymerization proceeds. The polydiacetylene-containing polymers can further undergo desired color changes in response to an external stimulus such as heat, a change in solvent or counterion, if available, or physical stress.

Both the color development of the polydiacetylene-containing polymers and the secondary color response of the polydiacetylene-containing polymers to stimuli is a function in part of the inherent degree of self-assembly, or ordering, of the system at the molecular level. The desired level of self-assembly can be facilitated by hydrogen bonding of the copolymer segment, such as polyurethanes. A polymer system that does not drive ordering, such as a material lacking hydrogen bonding sites for spontaneous assembly, is less desirable from a self-assembly perspective. Polyurethane systems can provide the self-assembly characteristics necessary to contribute to color development during polymerization and contribute to a chromogenic response in the resulting polymer.

Representative polymers of the invention are thus polyurethane-based. The term "polyurethane" as used herein includes polymers containing urethane (also known as carbamate) linkages, urea linkages, or combinations thereof, i.e., in the case of poly(urethane-urea)s. Thus, polyurethane-based polymers of the invention contain at least one urethane linkage and, optionally, an urea linkage. Preferably, the polymers generally are formed where the backbone has at least 80% urethane and/or urea repeat linkages formed during the polymerization process, such as the polymerization processes described below. In general, the polyurethane-based polymers are formed from prepolymers that are preferably terminated by isocyanate groups. Other reactants used to form the polymer from the prepolymers are selected such that at least about 80%, preferably at least about 90%, more preferably at least about about 95%, and most preferably essentially 100% of the repeat linkages between polymeric segments formed in the polymeric backbone during polymerization are urethane and urea linkages.

Polymers of the present invention may be derived from 100% solids, solventborne or waterborne systems. Waterborne systems are considered generally desirable for cost, environmental, safety, and regulatory reasons. Thus, in many embodiments, the polyurethane-based polymers of the invention are derived from waterborne systems, using water as the primary dispersing medium.

Dispersions of the invention are prepared by reacting components, including at least one isocyanate-reactive (e.g., hydroxy-functional, such as polyol) component, at least one diacetylene-containing isocyanate reactive component, at least one isocyanate-functional (e.g., polyisocyanate) component, and at least one reactive emulsifying compound, to form an isocyanate-terminated polyurethane prepolymer. The polyurethane-based prepolymer is then dispersed, and chain-extended, in a dispersing medium such as water to form polyurethane-based dispersions of the invention.

Components of polyurethane-based polymers of the invention are further described below, with reference to certain terms understood by those in the chemical arts as referring to certain hydrocarbon groups. Reference is also made throughout the specification to polymeric versions thereof. In that case, the prefix "poly" is inserted in front of the name of the corresponding hydrocarbon group.

Except where otherwise noted, such hydrocarbon groups, as used herein, may include one or more heteroatoms (e.g., oxygen, nitrogen, sulfur, or halogen atoms), as well as functional groups (e.g., oxime, ester, carbonate, amide, ether, urethane, urea, carbonyl groups, or mixtures thereof).

The term "aliphatic group" means a saturated or unsaturated, linear, branched, or cyclic hydrocarbon group. This term is used to encompass alkyl, alkylene (e.g., oxyalkylene), aralkylene, and cycloalkylene groups, for example.

The term "alkylene group" means a saturated, linear or branched, divalent hydrocarbon group. Particularly preferred alkylene groups are oxyalkylene groups.

The term "oxyalkylene group" means a saturated, linear or branched, divalent hydrocarbon group with a terminal oxygen atom.

The term "aralkylene group" means a saturated, linear or branched, divalent hydrocarbon group containing at least one aromatic group.

The term "cycloalkylene group" means a saturated, linear or branched, divalent hydrocarbon group containing at least one cyclic group.

The term "oxycycloalkylene group" means a saturated, linear or branched, divalent hydrocarbon group containing at least one cyclic group and a terminal oxygen atom.

The term "alkenylene group" means a straight or branched chain or cyclic divalent hydrocarbon group having a specified number of carbon atoms and one or more carbon—carbon double bonds.

The term "aromatic group" means a mononuclear aromatic hydrocarbon group or polynuclear aromatic hydrocarbon group. The term includes arylene groups.

The term "arylene group" means a divalent aromatic group.

Isocyanate-Reactive Components

Any suitable isocyanate-reactive component can be used in the present invention. As understood by one of ordinary skill in the art, an isocyanate-reactive component includes at least one active hydrogen. Those of ordinary skill in the polyurethane chemistry art will also understand that a wide variety of materials are suitable for this component. For example, amines, thiols, and polyols are isocyanate-reactive components.

Multifunctional isocyanate-reactive components, as opposed to monofunctional isocyanate-reactive components, have at least two active hydrogens. Generally difunctional, i.e. two active hydrogens, isocyanate-reactive components are used in the present invention.

In certain embodiments, at least one of the isocyanate-reactive components is a hydroxy-functional material. Polyols are the preferred hydroxy-functional material used in the present invention. Polyols of the invention can be of any molecular weight, including relatively low molecular weight polyols (i.e., having a weight average molecular weight of less than about 250) commonly referred to as "chain extenders" or "chain extending agents," as well as those polyols having higher molecular weights. Polyols provide urethane linkages when reacted with an isocyanate-functional component, such as a polyisocyanate.

In general, preferred polyols useful in the present invention can be represented by Formulas I and II:

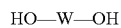    I

    II

Wherein n equals 3 or more, W represents an aliphatic group, aromatic group, oxyalkylene, mixtures thereof, polymers thereof, or copolymers thereof. In Formula II, W is n-valent. Preferably W is a polyalkylene group, polyoxyalkylene group, or mixtures thereof.

Examples of polyols useful in the present invention include, but are not limited to, polyester polyols (e.g., lactone polyols) and the alkylene oxide (e.g., ethylene oxide; 1,2-epoxypropane; 1,2-epoxybutane; 2,3-epoxybutane; isobutylene oxide; and epichlorohydrin) adducts thereof, polyether polyols (e.g., polyoxyalkylene polyols, such as polypropylene oxide polyols, polyethylene oxide polyols, polypropylene oxide polyethylene oxide copolymer polyols, and polyoxytetramethylene polyols; polyoxycycloalkylene polyols; polythioethers; and alkylene oxide adducts thereof), polyalkylene polyols, mixtures thereof, and copolymers therefrom.

When copolymers of polyols are used, chemically similar repeating units may be randomly distributed throughout the copolymer or in the form of blocks in the copolymer. Similarly, chemically similar repeating units may be arranged in any suitable order within the copolymer. For example, oxyalkylene repeating units may be internal or terminal units within a copolymer. The oxyalkylene repeating units may be randomly distributed or in the form of blocks within a copolymer.

When higher molecular weight polyols (i.e., polyols having weight average molecular weights of at least about 2,000) are used, it is preferred that the polyol component be "highly pure" (i.e., the polyol approaches its theoretical functionality—e.g., 2.0 for diols, 3.0 for triols, etc.), as described in U.S. Pat. No. 6,642,304 (Hansen et. al) and U.S. Pat. No. 6,518, 359 (Clemens et al). These highly pure polyols preferably have a ratio of polyol molecular weight to weight % monol of at least about 800, preferably at least about 1,000, and more preferably at least about 1,500. For example, a 12,000 molecular weight polyol with 8 weight % monol has such a ratio of 1,500 (i.e., 12,000/8=1,500). Preferably, the highly pure polyol contains about 8% by weight monol or less.

Generally, as the molecular weight of the polyol increases, a higher proportion of monol may be present in the polyol. For example, polyols having molecular weights of about 3,000 or less preferably contain less than about 1% by weight of monols. Polyols having molecular weights of greater than about 3,000 to about 4,000 preferably contain less than about 3% by weight of monols. Polyols having molecular weights of greater than about 4,000 to about 8,000 preferably contain less than about 6% by weight of monols. Polyols having molecular weights of greater than about 8,000 to about 12,000 preferably contain less than about 8% by weight of monols. Examples of highly pure polyols include those available from Bayer Corp. of Houston, Tex., under the trade designation, ACCLAIM.

Other benefits derived from using highly pure polyols include the ability to form relatively high molecular weight polymers without undesirable levels of crosslinking. Excessive crosslinking can affect the ability of the diacetylenes to self-assemble during formation of the polymer.

When higher functional polyols, i.e., triols, are used, the amount of crosslinking can be controlled by the use of a capping agent as described in applicants copending application entitled "Polyurethane-based Pressure Sensitive Adhesives and Methods of Manufacture" U.S. Ser. No. 10/742, 420. In addition to their use as the isocyanate-reactive component, the higher functional polyols can also be used as a source of diols for use in the isocyanate-reactive component. After conversion, the reaction products of the higher functional polyols are considered diols as described in U.S. Pat. No. 6,642,304 (Hansen et. al) and U.S. Pat. No. 6,518, 359 (Clemens et al). When the triol is used to prepare the diol, the ester-acid reaction products contribute to the emulsifying effect in addition to the reactive emulsifying compound, which is described below, when preparing polyurethane-based dispersions of the invention.

For broader formulation latitude, two or more isocyanate-reactive materials, such as polyols, may be used for the isocyanate-reactive component. For example, a mixture of diols of differing molecular weights can be used as isocyanate-reactive component, as generally described in U.S. Pat. No. 6,642,304 (Hansen et al).

Diacetylene-Containing Isocyanate-Reactive Component

At least one diacetylene-containing isocyanate-reactive component is also provided. In most embodiments, the diacetylene-containing isocyanate-reactive component is a hydroxy-functional material. Diacetylenic polyols are the preferred hydroxy-functional material used in the present invention. Polyols of the invention can be of any molecular weight, including relatively low molecular weight polyols. Diacetylenic diols can be synthesized for example by performing a Glaser-coupling of an alkyn-ol to form the desired diacetylene diol, as described in Siemsen, P.; Livingston R. C.; Diederich, F.; *Angewandte Chemie International Edition*, 2000, 39 (15), 2632-2657.

The minimum diacetylene concentration for color development will depend in part on the diacetylenic diol added. The color development in the polymer contributed by the diacetylene diol is in part a function of the length of the linear hydrocarbon chain between the acetylene and the active hydrogen. In most embodiments, optimum color development in the diacetylene-containing urethane polymer system is achieved using a diacetylenic diol with an at least two carbon atom chain between the acetylene and the active hydrogen. In most embodiments, the diacetylenic diol contains a carbon atom chain with four, five or six carbon atoms. In some embodiments, the diacetylenic diol contains a carbon atom chain of less than nine carbon atoms. The choice of diacetylenic diol will also affect the strength of the secondary chromogenic responses.

In certain embodiments, the diacetylenic diol is at least 10 mole percent of the total hydroxyl moles added. In other embodiments, the diacetylenic diol comprises about 30 mole percent of the total hydroxyl moles added, or about 2 weight percent of the hydroxyl moles added.

Examples of diacetylene-reactive polyols useful in the present invention include, but are not limited to, 5,7-dodecadiyne-1,12-diol; 6,8-tetradecadiyne-1, 14-diol; 7,9-hexadecadiyne-1,16-diol; 8,10-octadecadiyne-1,18-diol; 9,11-eicosadiyne-1,20-diol; and 3,5-octadiyne-1,8-diol.

In certain embodiments, the diacetylene-containing isocyanate reactive component contains other isocyanate-reactive functional groups, such as carboxyl or ester-activating groups. Suitable diacetylene compounds with these groups include those disclosed in Applicants' copending applications, U.S. Ser. No. 10/325,276; and published applications 2004/0126897 and 2004/0132217. The diacetylene compounds include those of the formula

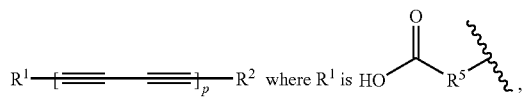

where $R^1$ is HO

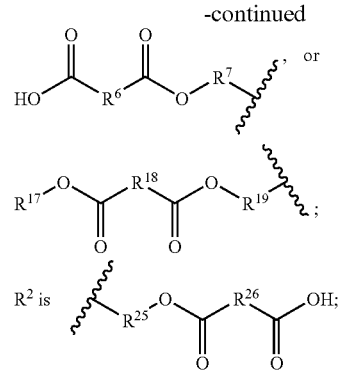

$R^5$, $R^7$, $R^{19}$, and $R^{25}$ are independently alkylene; $R^6$, $R^{18}$, and $R^{26}$ are independently alkylene, alkenylene, or arylene; $R^{17}$ is an ester activating group; p is 1-5; and where $R^1$ and $R^2$ are not the same.

Examples of $R^5$ include $C_1$-$C_{14}$ alkylene, and $C_1$-$C_3$ alkylene. Additional examples of $R^5$ include ethylene (—$CH_2CH_2$—), and trimethylene (—$CH_2CH_2CH_2$—).

Examples of $R^6$ when $R^6$ is alkylene include $C_1$-$C_{14}$ alkylene, and $C_1$-$C_3$ alkylene. Additional examples of $R^6$ when $R^6$ is alkylene include ethylene (—$CH_2CH_2$—), and trimethylene (—$CH_2CH_2CH_2$—). Examples of $R^6$ when $R^6$ is alkenylene include $C_2$-$C_8$ alkenylene, and $C_2$-$C_4$ alkenylene. An additional example of $R^6$ when $R^6$ is alkenylene includes ethenylene (—C=C—). Examples of $R^6$ when $R^6$ is arylene include $C_6$-$C_{13}$ arylene, and phenylene. An additional example of $R^6$ when $R^6$ is arylene is benzene-1,2-diyl.

Examples of $R^7$ include $C_1$-$C_{14}$ alkylene, and $C_2$-$C_9$ alkylene. Additional examples of $R^7$ include ethylene (—$CH_2CH_2$—), trimethylene (—$CH_2CH_2CH_2$—), tetramethylene (—$CH_2CH_2CH_2CH_2$—), pentamethylene (—$CH_2CH_2CH_2CH_2CH_2$—), hexamethylene (—$CH_2CH_2CH_2CH_2CH_2CH_2$—), heptamethylene (—$CH_2CH_2CH_2CH_2CH_2CH_2CH_2$—), octamethylene (—$CH_2CH_2CH_2CH_2CH_2CH_2CH_2CH_2$—), and nonamethylene (—$CH_2CH_2CH_2CH_2CH_2CH_2CH_2CH_2CH_2$—).

Examples of $R^{17}$ include groups that activate the neighboring ester group toward acyl transfer. Such ester activating groups include pentafluorophenol, pentachlorophenol, 2,4,6-trichlorophenol, 3-nitrophenol, N-hydroxysuccinimide, N-hydroxyphthalimide and those disclosed in M. Bodanszky, "Principles of Peptide Synthesis," (Springer-Verlag, 1984), for example. An additional example of $R^{17}$ is 2,5-dioxo-1-pyrrolidinyl.

Examples of $R^{18}$ when $R^{18}$ is alkylene include $C_1$-$C_{14}$ alkylene, and $C_1$-$C_3$ alkylene. Additional examples of $R^{18}$ when $R^{18}$ is alkylene include ethylene (—$CH_2CH_2$—), and trimethylene (—$CH_2CH_2CH_2$—). Examples of $R^{18}$ when $R^{18}$ is alkenylene include $C_2$-$C_8$ alkenylene, and $C_2$-$C_4$ alkenylene. An additional example of $R^{18}$ when $R^{18}$ is alkenylene includes ethenylene (—C=C—). Examples of $R^{18}$ when $R^{18}$ is arylene include $C_6$-$C_{13}$ arylene, and phenylene. An additional example of $R^{18}$ when $R^{18}$ is arylene is benzene-1,2-diyl.

Examples of $R^{19}$ include $C_1$-$C_{14}$ alkylene, and $C_2$-$C_9$ alkylene. Additional examples of $R^{19}$ include ethylene (—$CH_2CH_2$—), trimethylene (—$CH_2CH_2CH_2$—), tetramethylene (—$CH_2CH_2$ $CH_2CH_2$—), pentamethylene (—$CH_2CH_2CH_2CH_2CH_2$—), hexamethylene (—$CH_2CH_2CH_2$ $CH_2CH_2CH_2$—), heptamethylene (—CH$_2$CH$_2$CH$_2$CH$_2$CH$_2$CH$_2$—), octamethylene (—CH$_2$CH$_2$CH$_2$CH$_2$CH$_2$CH$_2$CH$_2$CH$_2$—), and nonamethylene (—CH$_2$CH$_2$CH$_2$CH$_2$CH$_2$CH$_2$CH$_2$CH$_2$CH$_2$—).

Examples of R$^{25}$ include C$_1$-C$_{14}$ alkylene, and C$_2$-C$_9$ alkylene. Additional examples of R$^{25}$ include ethylene (—CH$_2$CH$_2$—), trimethylene (—CH$_2$CH$_2$CH$_2$—), tetramethylene (—CH$_2$CH$_2$ CH$_2$CH$_2$—), pentamethylene (—CH$_2$CH$_2$CH$_2$CH$_2$CH$_2$—), hexamethylene (—CH$_2$CH$_2$CH$_2$ CH$_2$CH$_2$CH$_2$—), heptamethylene (—CH$_2$CH$_2$CH$_2$CH$_2$CH$_2$CH$_2$CH$_2$—), octamethylene (—CH$_2$CH$_2$CH$_2$CH$_2$CH$_2$CH$_2$CH$_2$CH$_2$—), and nonamethylene (—CH$_2$CH$_2$CH$_2$CH$_2$CH$_2$CH$_2$CH$_2$CH$_2$CH$_2$—).

Examples of R$^{26}$ when R$^{26}$ is alkylene include C$_1$-C$_{14}$ alkylene, and C$_1$-C$_3$ alkylene. Additional examples of R$^{26}$ when R$^{26}$ is alkylene include ethylene (—CH$_2$CH$_2$—), and trimethylene (—CH$_2$CH$_2$CH$_2$—). Examples of R$^{26}$ when R$^{26}$ is alkenylene include C$_2$-C$_8$ alkenylene, and C$_2$-C$_4$ alkenylene. An additional example of R$^{26}$ when R$^{26}$ is alkenylene includes ethenylene (—C═C—). Examples of R$^{26}$ when R$^{26}$ is arylene include C$_6$-C$_{13}$ arylene, and phenylene. An additional example of R$^{26}$ when R$^{26}$ is arylene is benzene-1,2-diyl.

For broader formulation latitude, two or more diacetylene-containing isocyanate-reactive materials, such as those described above, may be used for the diacetylene-containing isocyanate-reactive component. For example, a mixture of diacetylene diols can be used as the diacetylene-containing isocyanate-reactive component.

Isocyanate-Functional Component

The isocyanate-reactive and diacetylene-containing isocyanate-reactive components are reacted with an isocyanate-functional component during formation of the polyurethane-based diacetylene-containing prepolymer. The isocyanate-functional component may contain one isocyanate-functional material or mixtures of isocyanate-functional materials. Polyisocyanates, including derivatives thereof (e.g., ureas, biurets, allophanates, dimers and trimers of polyisocyanates, and mixtures thereof), (hereinafter collectively referred to as "polyisocyanates") are the preferred isocyanate-functional materials for the isocyanate-functional component. Polyisocyanates have at least two isocyanate-functional groups and provide urethane linkages when reacted with the preferred hydroxy-functional diacetylene-containing isocyanate-reactive and isocyanate-reactive components.

Generally, diisocyanates are the preferred polyisocyanates. Particularly preferred diisocyanates useful in the present invention can be generally represented by Formula III:

OCN—Z—NCO (III)

wherein Z represents any suitable divalent radical, which may be, for example, polymeric or oligomeric. For example, Z can be based on arylene (e.g., phenylene), aralkylene, alkylene, cycloalkylene, polysiloxane (e.g., polydimethyl siloxane), or polyoxyalkylene (e.g., polyoxyethylene, polyoxypropylene, and polyoxytetramethylene) segments and mixtures thereof. Preferably Z has about 1 to about 20 carbon atoms, and more preferably about 6 to about 20 carbon atoms.

For example, Z can be selected from 2,6-tolylene; 2,4-tolylene; 4,4'-methylenediphenylene; 3,3'-dimethoxy-4,4'-biphenylene; tetramethyl-m-xylylene; 4,4'-methylenedicyclohexylene; 3,5,5-trimethyl-3-methylenecyclohexylene; 1,6-hexamethylene; 1,4-cyclohexylene; 2,2,4-trimethylhexylene; or polymeric or oligomeric alkylene, aralkylene, or oxyalkylene radicals and mixtures thereof. When Z is a polymeric or oligomeric material it may include, for example, urethane linkages.

In addition to the selection of the diacetylene-containing isocyanate-reactive component, the type of polyisocyanate used for the isocyanate-functional material may affect the properties, such as color development, of the diacetylene-containing urethane polymer. Both the structure of the diisocyanate and its location in the resulting polymer chain (e.g., the distance between urethane linkages in the polymer chain and the atom constituents between the urethane linkages) can affect the flexibility of the polymer. A less flexible linkage will generally work to hinder the self-assembly of the diacetylene segments, and potentially affect color development.

The structure of the diisocyanate may also affect the properties, such as color development, of the diacetylene-containing urethane polymer. For example, in some polymer systems, linear primary diisocyanates or linearity of the polymer backbone can assist assembly on the molecular level. However, any diisocyanate that can react with the isocyanate-reactive material can potentially be used in the present invention. Examples of such diisocyanates include, but are not limited to, aromatic diisocyanates (e.g., 2,6-tolyene diisocyanate; 2,5-tolyene diisocyanate; 2,4-tolyene diisocyanate; m-phenylene diisocyanate; 5-chloro-2,4-tolyene diisocyanate; and 1-chloromethyl-2,4-diisocyanato benzene), aromatic-aliphatic diisocyanates (e.g., m-xylylene diisocyanate and tetramethyl-m-xylylene diisocyanate), aliphatic diisocyanates (e.g., 1,4-diisocyanatobutane; 1,6-diisocyanatohexane; 1,12-diisocyanatododecane; and 2-methyl-1,5-diisocyanatopentane), and cycloaliphatic diisocyanates (e.g., methylenedicyclohexylene-4,4'-diisocyanate; 3-isocyanatomethyl-3,5,5-trimethylcyclohexyl isocyanate (isophorone diisocyanate); 2,2,4-trimethylhexyl diisocyanate; and cyclohexylene-1,4-diisocyanate), and other compounds terminated by two isocyanate-functional groups (e.g., the diurethane of tolyene-2,4-diisocyanate-terminated polypropylene oxide polyol). Particularly preferred diisocyanates include 4,4'-methylenebis(phenyl isocyanate); 4,4'-methylene bis (cyclohexylisocyanate); and hexamethylene diisocyanate.

Other polyisocyanates may also be used, for example, in combination with diisocyanates, for the polyisocyanate component. For example, triisocyanates may be used. Triisocyanates include, but are not limited to, polyfunctional isocyanates, such as those produced from biurets, isocyanurates, adducts, and the like. Some commercially available polyisocyanates include portions of the DESMODUR and MONDUR series from Bayer Corporation; Pittsburgh, Pa., and the PAPI series from Dow Plastics, a business group of the Dow Chemical Company; Midland, Mich. Preferred triisocyanates include those available from Bayer Corporation under the trade designations DESMODUR N-3300 and MONDUR 489.

Reactive Emulsifying Compound

When preparing polyurethane-based dispersions of the invention, the other components are generally reacted with at least one reactive emulsifying compound. The reactive emulsifying compound contains at least one anionic-functional group, cationic-functional group, group that is capable of forming an anionic-functional group or cationic-functional group, or mixtures thereof. As used herein, the term "reactive emulsifying compound" describes a compound that acts as an internal emulsifier because it contains at least one ionizable group.

Reactive emulsifying compounds are capable of reacting with at least one of the isocyanate-reactive, diacetylene-containing isocyanate reactive, and isocyanate-functional components to become incorporated into the polyurethane prepolymers. Thus, the reactive emulsifying compound contains at least one, preferably at least two, isocyanate- or active hydrogen-reactive (e.g., hydroxy-reactive) groups. Isocyanate- and hydroxy-reactive groups include, for example, isocyanate, hydroxyl, mercapto, and amine groups.

The incorporation of a reactive emulsifying compound in the polyurethane prepolymer allows for water dispersibility of the polyurethane prepolymer and resulting polymer. Furthermore, such dispersions do not generally require external emulsifiers, such as surfactants, for stability.

Preferably, a sufficient amount of reactive emulsifying compound is reacted such that an external emulsifier is not necessary for preparing a storage-stable dispersion. When a sufficient amount of the reactive emulsifying compound is used, the polyurethane prepolymers are able to be dispersed into finer particles using less shear force than what has previously been possible with many conventional dispersions. A sufficient amount is generally such that the resulting polyurethane-based polymer comprises about 0.5 to about 5 weight percent, more preferably about 0.75 to about 3 weight percent, of segments derived from the reactive emulsifying compound. Below this amount, polyurethanes produced may be difficult to disperse, and dispersions produced therefrom may be unstable (i.e., subject to de-emulsification and/or coagulation at temperatures above room temperature, or at temperatures greater than about 20° C.). However, if polyols containing polyethylene oxide are used, the amount of reactive emulsifying compound used in this preferred embodiment may be less to form a stable dispersion. On the other hand, employing more reactive emulsifying compound in the reaction may produce an unstable dispersion or a resulting composition with sensitivity to moisture.

In certain embodiments, the reactive emulsifying compound contains at least one anionic-functional group or group that is capable of forming such a group (i.e., an anion-forming group) when reacted with the isocyanate-reactive (e.g., polyol) and isocyanate-functional (e.g., polyisocyanate) components. The anionic-functional or anion-forming groups of the reactive emulsifying compound can be any suitable group that contributes to ionization of the reactive emulsifying compound. For example, suitable groups include carboxylate, sulfate, sulfonate, phosphate, and similar groups.

The preferred structure for reactive emulsifying compounds with anionic-functional groups is generally represented by Formula IV:

(IV)

wherein G is OH, NHR or SH and wherein Q is a negatively charged moiety selected from COO⁻ and SO₃⁻, or a group that is capable of forming such a negatively charged moiety upon ionization. Each of X, Y and $R^1$ may be the same or different. X, Y, R, and $R^1$ are independently selected from aliphatic organic radicals free of reactive functional groups (e.g., alkylene groups that are free of reactive functional groups), preferably having from about 1 to about 20 carbon atoms, and combinations thereof, with the provisos that: (i.) R can be hydrogen; and (ii.) $R^{-1}$ is not required if Q is COO⁻ and SO₃⁻.

As an example, dimethylolpropionic acid (DMPA) is a useful reactive emulsifying compound for certain embodiments of the invention. Furthermore, 2,2-dimethylolbutyric acid, dihydroxymaleic acid, and sulfopolyester diol are other useful reactive emulsifying compounds.

In certain embodiments, the reactive emulsifying compound contains at least one cationic-functional group or group that is capable of forming such a group (i.e., a cation-forming group) when reacted with the isocyanate-reactive (e.g., polyol) and isocyanate-functional (e.g., polyisocyanate) components. The cationic-functional or cation-forming groups of the reactive emulsifying compound can be any suitable group that contributes to ionization of the reactive emulsifying compound. In most embodiments, the reactive emulsifying compound is an amine.

The preferred structure for reactive emulsifying compounds with cationic-functional groups is generally represented by Formula V:

(V)

wherein G is OH, NHR or SH. Each of X and Y may be the same or different. X, Y, and R are independently selected from aliphatic organic radicals free of reactive functional groups (e.g., alkylene groups that are free of reactive functional groups), preferably having from about 1 to about 20 carbon atoms, and combinations thereof, with the proviso that R can also be hydrogen.

Depending on the desired application, anionic or cationic reactive-emulsifying compounds may be preferable. For example, when used in biological applications, it may be preferred that the reactive emulsifying agent contain a cationic-functional group. In those circumstances, the cationic feature of the polymer may minimize the potential for interaction with other additives, such as antimicrobials. This may be a particular concern, for example, in medical applications.

Other useful compounds for the reactive emulsifying compounds include those described as water-solubilizing compounds in U.S. Pat. No. 5,554,686, which is incorporated herein by reference. Those of ordinary skill in the art will recognize that a wide variety of reactive emulsifying compounds are useful in the present invention.

Optional Chain Extending Agents

As recognizable to those of ordinary skill in the art, the prepolymer may be chain extended using suitable chain extenders, which may be selected according to whether the polymer is formed using a 100% solids, solventborne, or waterborne system.

When the chain extending agent comprises a polyamine, any suitable compound having at least two amine functional groups can be used for the polyamine. For example, the compound may be a diamine, triamine, etc. Mixtures of polyamines may also be used for the chain extending agent. Examples of polyamines useful in the present invention include, but are not limited to, polyoxyalkylene polyamines, alkylene polyamines, and polysiloxane polyamines. Preferably, the polyamine is a diamine.

The polyoxyalkylene polyamine may be, for example, a polyoxyethylene polyamine, polyoxypropylene polyamine, polyoxytetramethylene polyamine, or mixtures thereof. Polyoxyethylene polyamine may be especially useful in medical applications, for example, where a high vapor transfer medium and/or water absorbency may be desirable.

Many polyoxyalkylene polyamines are commercially available. For example, polyoxyalkylene diamines are available under trade designations such as D-230, D-400, D-2000, D-4000, DU-700, ED-2001 and EDR-148 (available from Huntsman Corporation; Houston, Tex., under the family trade designation JEFFAMINE). Representative polyoxyalkylene triamines are available under trade designations such as T-3000 and T-5000 (available from Huntsman Corporation; Houston, Tex.).

Alkylene polyamines include, for example, ethylene diamine; diethylene triamine; triethylene tetramine; propylene diamine; butylene diamine; hexamethylene diamine; cyclohexylene diamine; piperazine; 2-methyl piperazine; phenylene diamine; tolylene diamine; xylylene diamine; tris (2-aminoethyl) amine; 3,3'-dinitrobenzidine; 4,4'-methylenebis(2-chloroaniline); 3,3'-dichloro-4,4'-biphenyl diamine; 2,6-diaminopyridine; 4,4'-diaminodiphenylmethane; menthane diamine; m-xylene diamine; isophorone diamine; and dipiperidyl propane. Many alkylene polyamines are also commercially available. For example, alkylene diamines are available under trade designations such as DYTEK A and DYTEK EP (available from DuPont Chemical Company; Wilmington, Del.).

Polyurethane-Based Polymer Preparation

In general, the isocyanate-reactive component, the diacetylene-containing isocyanate-reactive component, and isocyanate-functional components, along with the reactive emulsifying compound, are allowed to react, forming an isocyanate-terminated diacetylene-containing polyurethane prepolymer (i.e., a polymer having a weight average molecular weight of less than about 50,000). Once formed, the polymer generally contains on average less than 2.5 isocyanate-functional groups. In many embodiments, the isocyanate-functional groups on the prepolymer on average range from 1.8 to 3. In general, the isocyanate-functional group to isocyanate-reactive group ratio of the reactants is preferably about 1.1 to about 2.5, most typically about 1.5. If the isocyanate-functional group to isocyanate-reactive group ratio is lower than in this preferred range, prepolymer viscosity may be too high to be useful for forming dispersions according to one aspect of the invention.

In many applications, a catalyst can be used to facilitate the reaction by increasing the reaction kinetics, and aid in molecular weight development for a given reaction time. Suitable catalysts include those listed in U.S. Pat. No. 5,554,686. A preferred catalyst is dibutyltindilaurate (DBTDL). In those applications where higher molecular weight levels are desirable, a catalyst will aid the molecular weight of the resulting polymer system.

The isocyanate-terminated prepolymer is then optionally chain extended with a chain extending agent (e.g., water (including ambient moisture), a polyamine, a relatively low molecular weight polyol (i.e., a polyol having a weight average molecular weight of less than about 250) and combinations thereof) to increase its molecular weight, when preparing the polymer in a waterborne or solventborne system. Prior to chain extending the isocyanate-terminated prepolymer, generally the prepolymer is first introduced into a dispersing or solvating medium (e.g., water or an organic solvent such as N-methylpyrolidone, acetone, methyl ethyl ketone (MEK), or combinations thereof). The addition of organic solvents in a prepolymer system may also help in reducing the viscosity of the prepolymer, which facilitates formation of the dispersion. In many embodiments, the reactions are carried out at about 20% solids in solution.

In waterborne systems, typically a neutralizing agent capable of reacting with the reactive-emulsifying agent is also added to the polyurethane prepolymer to more easily disperse the polyurethane prepolymer in the dispersing medium. Such neutralizing agents are described as salt-forming compounds in U.S. Pat. No. 5,554,686. The nature of the reactive emulsifying agent, i.e., whether cationic-functional or anionic-functional, will determine the neutralizing agent used. For example, a base, such as a tertiary amine or alkali metal salt, can be used as a neutralizing agent to neutralize any anion-forming groups in the polymeric chain and more easily disperse the polyurethane prepolymer in the dispersing medium. The neutralizing agent can be added to the polyurethane prepolymer before introducing it into the dispersing medium or alternatively, neutralization can occur after introducing the polyurethane prepolymer into the dispersing medium. In many embodiments, the neutralizing agent is introduced simultaneously with dispersion.

In a waterborne system, the prepolymer can be chain extended during the dispersion step through the reaction of the isocyanate-functional groups with water, at least one polyamine, or mixtures thereof. Isocyanate-functional groups react with water to form an unstable carbamic acid. The carbamic acid then converts to a primary amine and carbon dioxide. The primary amine forms a urea linkage with any remaining isocyanate-functional groups of the polyurethane prepolymer. When the chain extending agent comprises a polyamine, the polyamine forms urea linkages with the isocyanate-functional groups of the prepolymer. Thus, the resulting polyurethane-based polymer contains both urethane and urea linkages therein.

For most polymer systems, molecular weight distribution will have at least as great an impact as the average molecular weight, i.e., molecular weight distribution can affect the ultimate chromic and piezochromic behavior of the polymer. Low molecular weight chains help provide the degree of self-assembly needed for a visible chromogenic response while high molecular weight chains provide sufficient entanglement to transfer the energy from an applied stress across the conjugated network to produce a secondary color response.

Higher molecular weight diacetylene-containing polymer systems, with a number average molecular weight in the range of 30,000-50,000, provides color development and also enhances the integrity of the resulting polymer when coated as a film. Lower molecular weight diacetylene-containing polymer systems, such as number average molecular weights in the range between 5,000-10,000, turn color easily upon curing. However, the polymer system may have little to no integrity as exhibited by peel strength and shear strength of coated films.

Applications

Whether the polyurethane-based polymer is prepared from a solventborne or waterborne system, once the solution or dispersion is formed, it is easily applied to a substrate, optionally dried and then cured using any suitable source of radiation. Radiation sources include UV, gamma, electron-beam (e-beam), and solar sources. Exposure of the diacetylene-containing polymer to radiation results in a color development from clear to typically red or blue. In most embodiments, an ultraviolet (UV) radiation source is used to cure the polymers. The color development observed in the polymer is independent of the irradiation source utilized, but color intensity, i.e., chroma, is determined in part by the dosage applied.

The polymer can exhibit a post-radiation, or secondary chromogenic color change, in response to stimuli such as to solvents (solvatochromism), temperature change (thermochromism) and applied stress (piezochromism). Upon exposure to the stimuli, the polymer network undergoes yet another color change from the developed color to a secondary color, such as yellow. This secondary color change may be reversible, depending on the selection of the starting materials.

Time for development of color may affect the selection of starting materials. For those applications where rapid color development is not critical, longer time to allow self-assembly of the polymer system may determine the choice of materials.

The diacetylene-containing polyurethane-based polymer may be compounded with other materials to form a pressure sensitive adhesive (PSA). PSAs formed using the diacetylene-containing polyurethane-based polymer may contain various additives and other property modifiers. For example, fillers, such as fumed silica, fibers (e.g., glass, metal, inorganic, or organic fibers), carbon black, glass or ceramic beads/bubbles, particles (e.g., metal, inorganic, or organic particles), polyaramids (e.g., those available from DuPont Chemical Company; Wilmington, Del. under the trade designation, KEVLAR), and the like can be added, generally in amounts up to about 50 parts per hundred parts by weight of the polyurethane-based polymer, provided that such additives are not detrimental to the properties desired in the final PSA composition.

Other additives such as dyes, inert fluids (e.g., hydrocarbon oils), plasticizers, tackifiers, pigments, flame retardants, stabilizers, antioxidants, compatibilizers, antimicrobial agents (e.g., zinc oxide), electrical conductors, thermal conductors (e.g., aluminum oxide, boron nitride, aluminum nitride, and nickel particles), and the like can be blended into these compositions, generally in amounts of from about 1 to about 50 percent by total volume of the composition. It should be noted that, although tackifiers and plasticizers may be added, such additives may not be necessary for obtaining PSA properties in polyurethane-based compositions of the invention.

A PSA coating can be formed on a wide variety of substrates. For example, the PSA can be applied to sheeting products (e.g., decorative, reflective, and graphical), labelstock, and tape backings. The substrate can be any suitable type of material depending on the desired application. Typically, the substrate comprises a nonwoven, paper, polymeric film (e.g., biaxially oriented polypropylene (BOPP)), polyethylene, polyurea, polyurethane, or polyester (e.g., polyethylene terephthalate)), or release liner (e.g., siliconized liner).

Depending on the desired application and choice of starting materials, characteristics of the polymer range from tough thermoplastics to amorphous materials with little integrity. The diacetylene containing polymers may also be used as additives in certain select blends, such as acrylic PSAs, while still maintaining their chromogenic properties, as described in applicants' copending application, U.S. Ser. No. 10/922,091, entitled "Polydiacetylene Polymer Blends" and filed Aug. 19, 2004.

Objects and advantages of this invention are further illustrated by the following examples, but the particular materials and amounts thereof recited in these examples, as well as other conditions and details, should not be construed to unduly limit this invention.

EXAMPLES

These examples are merely for illustrative purposes only and are not meant to be limiting on the scope of the appended claims. All parts, percentages, ratios, etc. in the examples and the rest of the specification are by weight, unless noted otherwise. Furthermore, molecular weights in the examples and the rest of the specification are weight average molecular weights, unless noted otherwise. Solvents used were obtained from Aldrich Chemical Company, Milwaukee, Wis.

Dispersion Coating & Testing

The dispersions described in the following examples were coated using a 75 gauge Meyer rod on nitrogen corona treated PET to a dry film thickness of 20-30 micrometers (0.8-1.2 mils). The coated films were dried for one hour at ambient conditions, at 70° C. for ten minutes and stored at 23° C. and 50% R.H. overnight. The 180° peel adhesion and shear strength of the samples was tested using the test method listed below. The films were UV irradiated using a 300 W H lamp, two passes at 50 FPM. The color of the coating before and after UV irradiation was noted as well as the Chroma values ($C^*$) and hue angle ($h°$). Chroma values and hue angles were determined before and after exposure using a X-Rite spectrodensitometer, model #528L.

180° Peel Adhesion

This peel adhesion test is similar to the test method described in ASTM D 3330-90, substituting a glass substrate for the stainless steel substrate described in the test (for the present purpose, also referred to as "glass substrate peel adhesion test"). Film samples, prepared as described above, were cut into 1.27-centimeter strips. Each strip was then adhered to a 10 centimeter by 20 centimeter clean, solvent-washed glass coupon by passing a 2-kilogram roller once over the strip. The bonded assembly dwelled at room temperature for about one minute.

Each sample so prepared was tested for 180° peel adhesion using an IMASS slip/peel tester (Model 3M90, commercially available from Instrumentors Inc.; Strongsville, Ohio) at a rate of 2.3 meters/minute (90 inches/minute) using a five second data collection time. Two samples of each composition were tested. The reported peel adhesion value is an average of the peel adhesion value from each of the two samples.

Shear Strength

This shear strength test is similar to the test method described in ASTM D 3654-88. Film samples, prepared as described above, were cut into 1.27-centimeter by 15-centimeter strips. Each strip was then adhered to a stainless steel panel such that a 1.27-centimeter by 1.27-centimeter portion of each strip was in firm contact with the panel and one end portion of the strip hung free.

The panel with the attached strip was placed in a rack such that the panel formed an angle of 178° with the extended free end of the strip. The strip was tensioned by application of a force of one kilogram applied as a hanging weight from the free end of the strip. The 2° less than 180° was used to negate any peel forces, thus ensuring that only shear strength forces were measured, in an attempt to more accurately determine the holding power of the tape being tested.

The elapsed time for each sample to separate from the test panel was recorded as the shear strength. Each test was terminated at 10,000 minutes, unless the adhesive failed at an earlier time (as noted).

| Table of Abbreviations | |
|---|---|
| Abbreviation or Trade Designation | Description |
| ACCLAIM 4220N | A polyethylene oxide-capped polypropylene oxide diol with an approximate molecular weight of 4,000 grams/mole and an OH equivalent weight of approximately 2,000 grams/mole, commercially available from Bayer Corp., Pittsburgh, PA |
| DMPA | 2,2-dimethylolpropionic acid, commercially available from Aldrich Chemical Company; Milwaukee, Wisconsin |
| TEA | Triethylamine, commercially available from Aldrich Chemical Company; Milwaukee, Wisconsin |
| DBTDL | Dibutyltindilaurate, commercially available from Aldrich Chemical Company; Milwaukee, Wisconsin |
| HDI | Hexamethylene diisocyanate, commercially available from Aldrich Chemical Company; Milwaukee, Wisconsin |
| DAD | Diacetylene diol with the structure $HO(CH_2)_nC\equiv CC\equiv C(CH_2)_nOH$ defined by the value of n. |
| Terathane 2000 | A polytetramethylene ether glycol (PTMEG) diol with an approximate molecular weight of 2,000 grams/mole and an OH equivalent weight of approximately 1,000 grams/mole, commercially available from Du Pont Chemicals, Wilmington, Delaware |
| N-MDEA | N-methyldiethanolamine, commercially available from Aldrich Chemical Company; Milwaukee, Wisconsin |
| THF | Tetrahydrofuran, commercially available from Aldrich Chemical Company; Milwaukee, Wisconsin |
| Aquatac 6085 | A waterborne tackifier, commercially available from Arizona Chemical, Panama City, FL |
| SP | Sulfopolyester diol prepared as described in U.S. Pat. No. 5,929,160 Example 29, with a hydroxyl equivalent weight of 340. |
| PEG | Polyethylene glycol oligomer of 400 molecular weight |
| PET | Polyethylene terephthalate |
| FPM | Feet per minute |

Example 1

Part I: Prepolymer Preparation

The polyol Terathane 2000 was dehydrated in-vacuo at 90° C.-100° C. for about six hours and cooled to room temperature before use. In a glass reaction vessel, 30.03 parts by weight of Terathane 2000, 1.12 parts by weight of N-MDEA, 0.74 parts by weight of DAD with n=4 (i.e. 5,7-dodecadiyn-1,12-diol), 146 parts by weight of THF, 4.78 parts by weight of HDI and 0.05 parts by weight of DBTDL catalyst were combined. The sealed glass reaction vessel was rotated in a thermostated temperature bath at 80° C. for 16 hours.

Part II. Dispersion Preparation

A premix of 0.50 parts by weight of acetic acid and 160 parts by weight of distilled water was prepared. Then, 160.00 parts by weight of the prepolymer prepared in Part I was dispersed in the water/acetic acid premix in a Microfluidics Homogenizer Model # HC-5000 (commercially available from Microfluidics Corp.; Newton, Mass.) at a line air pressure of 0.621 MPa. The dispersion was stirred vigorously overnight at room temperature with a magnetic stirring bar. Dispersion was coated and tested as described above. The data are presented in Table 1.

Examples 1A-1D

To 30.0 g aliquots of the dispersion made above was added Aquatac 6085; 0.50 g (Ex. 1A), 1.25 g (Ex. 1B), 2.50 g (Ex. 1C) and 5.00 g (Ex. 1D). These were stirred vigorously overnight at room temperature with a magnetic stirring bar. These dispersions were coated and tested as described above. The data are presented in Table 1.

TABLE 1

| Example | Ratio- Ex. 1: Aquatac 6085 (solids) | Color Intensity pre-UV (C*) | Color Intensity post-UV (C*) | Color Hue Angle pre-UV (h°) | Color Hue Angle post-UV (h°) |
|---|---|---|---|---|---|
| 1 | 1.0:0.0 | 1.17 | 29.78 | 164.7 | 285.1 |
| 1A | 1.0:0.1 | 1.16 | 36.74 | 162.3 | 280.8 |
| 1B | 1.0:0.25 | 1.33 | 29.01 | 150.0 | 279.2 |
| 1C | 1.0:0.5 | 1.41 | 20.53 | 146.9 | 274.9 |
| 1D | 1.0:1.0 | 1.75 | 11.85 | 142.4 | 269.2 |

Example 2

Part I: Prepolymer Preparation

The polyol, ACCLAIM 4220N was dehydrated in-vacuo at 90° C.-100° C. for about six hours and cooled to room temperature before use. In a glass reaction vessel, 30.25 parts by weight of ACCLAIM 4220N, 1.09 parts by weight of N-MDEA, 0.72 parts by weight of DAD n=4 (i.e. 5,7-dodecadiyn-1,12-diol), 143 parts by weight of THF, 3.82 parts by weight of HDI and 0.05 parts by weight of DBTDL catalyst were combined. The sealed glass reaction vessel was rotated in a thermostated temperature bath at 80° C. for 16 hours.

Part II: Dispersion Preparation

Same as Example 1. The resulting data are shown in Table 2 below.

Example 3

Part I: Prepolymer Preparation

The polyol, ACCLAIM 4220N was dehydrated in-vacuo at 90° C.-100° C. for about six hours and cooled to room temperature before use. In a glass reaction vessel, 30.00 parts by weight of ACCLAIM 4220N, 1.09 parts by weight of N-MDEA, 0.71 parts by weight of DAD n=4 (i.e. 5,7-dodecadiyn-1,12-diol), 141 parts by weight of THF, 4.14 parts by weight of HDI and 0.06 parts by weight of DBTDL catalyst were combined. The sealed glass reaction vessel was rotated in a thermostated temperature bath at 80° C. for 16 hours.

Part II: Dispersion Preparation

A premix of 0.50 parts by weight of acetic acid and 164 parts by weight of distilled water was prepared. Then, 160.00 parts by weight of the prepolymer prepared in Part I was dispersed in the water/acetic acid premix in a Microfluidics Homogenizer Model # HC-5000 (commercially available from Microfluidics Corp.; Newton, Mass.) at a line air pressure of 0.621 MPa. The dispersion was stirred vigorously overnight at room temperature with a magnetic stirring bar. The dispersion was coated and tested as described above. The data are presented in Table 2.

Example 4

Part I: Prepolymer Preparation

The polyol, ACCLAIM 4220N was dehydrated in-vacuo at 90° C.-100° C. for about six hours and cooled to room temperature before use. In a glass reaction vessel, 30.00 parts by weight of ACCLAIM 4220N, 1.10 parts by weight of N-MDEA, 0.77 parts by weight of DAD n=4 (i.e. 5,7-dodecadiyn-1,12-diol), 148 parts by weight of THF, 5.27 parts by weight of HDI and 0.06 parts by weight of DBTDL catalyst were combined. The sealed glass reaction vessel was rotated in a thermostated temperature bath at 80° C. for 16 hours.

Part II: Dispersion Preparation

A premix of 0.50 parts by weight of acetic acid and 159 parts by weight of distilled water was prepared. Then, 160.00 parts by weight of the prepolymer prepared in Part I was dispersed in the water/acetic acid premix in a Microfluidics Homogenizer Model # HC-5000 (commercially available from Microfluidics Corp.; Newton, Mass.) at a line air pressure of 0.621 MPa. The dispersion was stirred vigorously overnight at room temperature with a magnetic stirring bar. The dispersion was coated and tested as described above. The data are presented in Table 2.

TABLE 2

| Example | Prepolymer NCO/OH | Mn (×1000) | Color Intensity pre-UV (C*) | Color Intensity post-UV (C*) | Color Hue Angle pre-UV (h°) | Color Hue Angle post-UV (h°) |
|---|---|---|---|---|---|---|
| 2 | 1.1 | 139 | 1.16 | 42.08 | 174.5 | 273.0 |
| 3 | 1.2 | 144 | 1.18 | 12.72 | 161.5 | 255.7 |
| 4 | 1.5 | 156 | 1.21 | 8.07 | 159.9 | 254.1 |

Example 5

Part I: Prepolymer Preparation

The polyol, Terathane 2000 was dehydrated in-vacuo at 90° C.-100° C. for about six hours and cooled to room temperature before use. In a glass reaction vessel, 30.22 parts by weight of Terathane 2000, 6.39 parts by weight of SP, 0.74 parts by weight of DAD n=4 (i.e. 5,7-dodecadiyn-1,12-diol), 167 parts by weight of THF, 4.80 parts by weight of HDI and 0.05 parts by weight of DBTDL catalyst were combined. The sealed glass reaction vessel was rotated in a thermostated temperature bath at 80° C. for 16 hours.

Part II: Dispersion Preparation 160.00 parts by weight of the prepolymer prepared in Part I was dispersed in 160.00 parts by weight of distilled water in a Microfluidics Homogenizer Model # HC-5000 (commercially available from Microfluidics Corp.; Newton, Mass.) at a line air pressure of 0.621 MPa. The dispersion was stirred vigorously overnight at room temperature with a magnetic stirring bar. The dispersion was coated and tested as described above. The data are presented in Table 3.

Example 6

Part I: Prepolymer Preparation

The polyol, Terathane 2000 was dehydrated in-vacuo at 90° C.-100° C. for about six hours and cooled to room temperature before use. In a glass reaction vessel, 30.03 parts by weight of Terathane 2000, 1.12 parts by weight DMPA, 0.74 parts by weight of DAD n=4 (i.e. 5,7-dodecadiyn-1,12-diol), 146 parts by weight of THF, 4.60 parts by weight of HDI and 0.05 parts by weight of DBTDL catalyst were combined. The sealed glass reaction vessel was rotated in a thermostated temperature bath at 80° C. for 16 hours.

Part II: Dispersion Preparation

A premix of 0.75 parts by weight of TEA and 159 parts by weight of distilled water was prepared. Then, 160.00 parts by weight of the prepolymer prepared in Part I was dispersed in the water/triethylamine premix in a Microfluidics Homogenizer Model # HC-5000 (commercially available from Microfluidics Corp.; Newton, Mass.) at a line air pressure of 0.621 MPa. The dispersion was stirred vigorously overnight at room temperature with a magnetic stirring bar. The dispersion was coated and tested as described above. The data are presented in Table 3.

TABLE 3

| Example | Ionic Stabilizer | Mn (×1000) | Color Intensity pre-UV (C*) | Color Intensity post-UV (C*) | Color Hue Angle pre-UV (h°) | Color Hue Angle post-UV (h°) |
|---|---|---|---|---|---|---|
| 1 | tert-N (cationic) | 119 | 1.17 | 29.78 | 164.7 | 285.1 |
| 5 | sulfonate (anionic) | 66 | 2.30 | 27.95 | 120.4 | 271.7 |
| 6 | carboxylate (anionic) | 41 | 2.30 | 32.90 | 140.1 | 273.6 |

Example 7

Part I: Prepolymer Preparation

The polyol, ACCLAIM 4220N was dehydrated in-vacuo at 90° C.-100° C. for about six hours and cooled to room temperature before use. In a glass reaction vessel, 39.73 parts by weight of ACCLAIM 4220N, 1.48 parts by weight of N-MDEA, 0.98 parts by weight of DAD n=4 (i.e. 5,7-dodecadiyn-1,12-diol), 51.30 parts by weight of acetone and 6.98 parts by weight of HDI were combined. The sealed glass reaction vessel was rotated in a thermostated temperature bath at 80° C. for 16 hours.

Part II: Dispersion Preparation

A premix of 0.67 parts by weight of acetic acid and 132.5 parts by weight of distilled water was prepared. Then, 90.00 parts by weight of the prepolymer prepared in Part I was dispersed in the water/acetic acid premix in a Microfluidics Homogenizer Model # HC-5000 (commercially available from Microfluidics Corp.; Newton, Mass.) at a line air pressure of 0.621 MPa. The dispersion was stirred vigorously overnight at room temperature with a magnetic stirring bar. These dispersions were coated and tested as described above. The data are presented in Table 4.

TABLE 4

| Example | Color Intensity pre-UV (C*) | Color Intensity post-UV (C*) | Color Hue Angle pre-UV (h°) | Color Hue Angle post-UV (h°) |
|---|---|---|---|---|
| 7 | NM | 39.38 | NM | 264.7 |

NM = Not measured

Example 8

Samples of the solutions of Examples 1-6 were coated and dried as described above. These samples were tested for 180° Peel and Shear Strength using the test methods described above. The data are presented in Table 5.

TABLE 5

| Example | Dispersion Example Number | Peel (N/dm) | Shear Strength (minutes) |
|---|---|---|---|
| 8A | 1 | 2.4 | 344 |
| 8B | 1A | 3.5 | 98 |
| 8C | 1B | 5.9 | 77 |
| 8D | 1C | 48.4 | 40 |
| 8E | 1D | 42.4 | 661 |
| 8F | 2 | 4.2 | 12 |
| 8G | 3 | 9.8 | 149 |
| 8H | 4 | 2.4 | 10,000 |
| 8I | 5 | 1.8 | 140 |
| 8J | 6 | split | 3 |

Example 9

In a glass reaction vessel was placed 10 milliliters of THF, 2.0 grams of PEG, 0.13 grams of DAD n=4 (i.e. 5,7-dodecadiyn-1,12-diol), 0.5 grams of N-MDEA, and 1.66 grams of HDI. The vessel was sealed, purged for 5 minutes with nitrogen and 1 drop of DBTDL catalyst was added. This mixture was stirred and heated at 65° C. for 6 hours. The mixture was cooled to room temperature, placed in an amber bottle and 0.50 grams of acetic acid was added. The resulting mixture was mixed overnight on a bottle roller. The resulting solution was coated onto a Release Liner using a knife coater at a thickness of 4 mils (102 micrometers) and placed in a 70° C. oven for 10 minutes to dry.

Examples 10-12

The same procedure was followed as for Example 9 with the reagents shown in Table 6. The resulting solutions were coated and dried as in Example 9.

TABLE 6

| Example | PEG (grams) | HDI (grams) | NMDEA (grams) | DAD n = 4 (grams) | Acetic Acid (grams) |
|---|---|---|---|---|---|
| 10 | 2.2 | 1.5 | 0.33 | 0.13 | 0.33 |
| 11 | 1.7 | 1.79 | 0.68 | 0.13 | 0.68 |
| 12 | 2.2 | 1.23 | 0.15 | 0.11 | 0.15 |

Examples 13-16

A release liner of coated with each of the dried solutions of Examples 9-12 were exposed to a peracetic acid buffer solution in a sterilization cycle (commercially available from STERIS). The coated solutions on the liner turned color from blue to red or yellow.

Examples 17-20

A release liner of coated with each of the dried solutions of Examples 9-12 were exposed to a 6 ppm solution of hydrogen peroxide in a sterilization cycle (commercially available from STERRAD). The coated solutions on the liner turned color from blue to red or yellow.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A polymer prepared by a method comprising:

providing an isocyanate-reactive component;

providing a diacetylene-containing isocyanate-reactive component;

providing an isocyanate-functional component;

providing a reactive emulsifying compound; and optionally providing a catalyst;

combining the isocyanate-reactive component, the diacetylene-containing component, the isocyanate-functional component, the reactive emulsifying compound, and the optional catalyst in an organic solvent and allowing them to react to form a diacetylene-containing polymer; and dispersing, and optionally chain extending, the diacetylene-containing polymer in a dispersing medium comprising water to form an aqueous dispersion comprising the diacetylene-containing polymer;

wherein the diacetylene-containing polymer undergoes a color change upon irradiation to form a polydiacetylene-containing polymer;

wherein the reactive emulsifying compound is represented by Formula (IV):

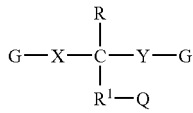

wherein:
G is selected from the group consisting of OH, NHR and SH;
Q is a negatively charged moiety selected from COO⁻ and SO₃⁻, or a group that forms such a negatively charged moiety upon ionization;
each of X, Y and R¹ may be the same or different;
X, Y, R, and R¹ are independently selected from aliphatic organic radicals free of reactive functional groups having from about 1 to about 20 carbon atoms, and combinations thereof;
R can be hydrogen; and
R¹ is optional if Q is COO⁻ and SO₃⁻;
or the reactive emulsifying compound is represented by Formula (V):

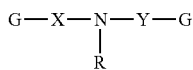

wherein:
G is selected from the group consisting of OH, NHR and SH;
each of X and Y may be the same or different;
each of X and Y are independently selected from aliphatic organic radicals having from about 1 to about 20 carbon atoms, free of reactive functional groups, and combinations thereof; and
R can be hydrogen or an aliphatic organic radical having from about 1 to about 20 carbon atoms, free of reactive functional groups.

2. The polymer of claim 1, wherein dispersing medium further comprises a neutralizing agent.

3. The polymer of claim 2, wherein the method further comprises chain extending the diacetylene-containing polymer.

4. The polymer of claim 1, wherein the isocyanate-reactive component comprises at least one polyoxyalkylene polyol.

5. The polymer of claim 1, wherein the isocyanate-functional component comprises a diisocyanate.

6. The polymer of claim 1, wherein the method further comprises adding a tackifier to the aqueous dispersion comprising the diacetylene-containing polymer.

7. The polymer of claim 1, wherein the method further comprises coating the dispersion on a substrate and removing the aqueous-based dispersing medium.

8. The polymer of claim 7, wherein the method further comprises irradiating the diacetylene-containing polymer with actinic radiation to form a polydiacetylene-containing polymer.

9. The polymer of claim 8, wherein the actinic radiation is selected from the group consisting of UV, gamma, electron-beam, and solar.

10. The polymer of claim 8, wherein the polydiacetylene-containing polymer is chromogenic and exhibits a secondary chromogenic response when exposed to an external stimulus.

11. The polymer of claim 1, which is a pressure sensitive adhesive.

12. The polymer of claim 1 comprising urethane groups, urea groups, or combinations thereof.

13. The polymer of claim 1, wherein the diacetylene-containing isocyanate-reactive component is a polyol comprising at least one diacetylene diol.

14. A polydiacetylene-containing polymer prepared by a method comprising:
providing an isocyanate-reactive component comprising a polyol;
providing a diacetylene-containing isocyanate-reactive component;
providing a isocyanate-functional component comprising a linear aliphatic diisocyanate;
providing a reactive emulsifying compound; and
optionally providing a catalyst;
combining the isocyanate-reactive component, the diacetylene-containing component, the isocyanate-functional component, the reactive emulsifying compound, and the optional catalyst in an organic solvent and allowing them to react to form a diacetylene-containing polymer;
dispersing, and optionally chain extending, the diacetylene-containing polymer in a dispersing medium comprising water to form an aqueous dispersion comprising the diacetylene-containing polymer;
removing the aqueous-based dispersing medium; and
irradiating the diacetylene-containing polymer with actinic radiation to form a polydiacetylene-containing polymer with a color change;
wherein the polydiacetylene-containing polymer is chromogenic and exhibits a secondary chromogenic response when exposed to an external stimulus; and
wherein the reactive emulsifying compound is represented by Formula (IV):

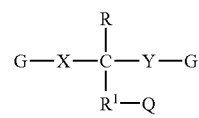

wherein:
G is selected from the group consisting of OH, NHR and SH;
Q is a negatively charged moiety selected from COO⁻ and SO₃⁻, or a group that forms such a negatively charged moiety upon ionization;
each of X, Y and R¹ may be the same or different;
X, Y, R, and R¹ are independently selected from aliphatic organic radicals free of reactive functional groups having from about 1 to about 20 carbon atoms, and combinations thereof;
R can be hydrogen; and
R¹ is optional if Q is COO⁻ and SO₃⁻;

or the reactive emulsifying compound is represented by Formula (V):

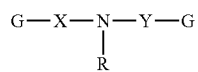
(V)

wherein:
G is selected from the group consisting of OH, NHR and SH;
each of X and Y may be the same or different;
each of X and Y are independently selected from aliphatic organic radicals having from about 1 to about 20 carbon atoms, free of reactive functional groups, and combinations thereof; and
R can be hydrogen or an aliphatic organic radical having from about 1 to about 20 carbon atoms, free of reactive functional groups.

15. The polymer of claim 14, which is a pressure sensitive adhesive.

16. The polymer of claim 14 comprising urethane groups, urea groups, or combinations thereof.

17. The polymer of claim 14, wherein the method further comprises chain extending the diacetylene-containing polymer.

18. The polymer of claim 14, wherein the diacetylene-containing isocyanate-reactive component is a polyol comprising at least one diacetylene diol.

19. An article, comprising:
a substrate, and
a polymer coating comprising a water-borne diacetylene-containing polymer at least partially coated on the substrate, wherein the diacetylene-containing polymer comprises the reaction product of components comprising:
an isocyanate-reactive component;
a diacetylene-containing isocyanate-reactive component;
an isocyanate-functional component;
a reactive emulsifying compound;
an optional catalyst; and
an optional chain extending agent;
wherein the diacetylene-containing polymer undergoes a color change upon irradiation to form a polydiacetylene-containing polymer; and
wherein the reactive emulsifying compound is represented by Formula (IV):

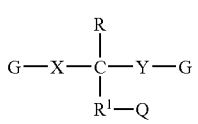
(IV)

wherein:
G is selected from the group consisting of OH, NHR and SH;
Q is a negatively charged moiety selected from COO⁻ and SO₃⁻, or a group that forms such a negatively charged moiety upon ionization;
each of X, Y and $R^1$ may be the same or different;
X, Y, R, and $R^1$ are independently selected from aliphatic organic radicals free of reactive functional groups having from about 1 to about 20 carbon atoms, and combinations thereof;

R can be hydrogen; and
$R^1$ is optional if Q is COO⁻ and SO₃⁻; or the reactive emulsifying compound is represented by Formula (V):

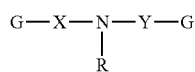
(V)

wherein:
G is selected from the group consisting of OH, NHR and SH;
each of X and Y may be the same or different;
each of X and Y are independently selected from aliphatic organic radicals having from about 1 to about 20 carbon atoms, free of reactive functional groups, and combinations thereof; and
R can be hydrogen or an aliphatic organic radical having from about 1 to about 20 carbon atoms, free of reactive functional groups.

20. The article of claim 19, wherein the diacetylene-containing polymer undergoes a color change upon irradiation with UV radiation to form a polydiacetylene-containing polymer.

21. The article of claim 20, wherein the polydiacetylene-containing polymer exhibits a secondary chromogenic response when exposed to an external stimulus.

22. The article of claim 19, wherein the isocyanate-reactive component comprises a polyol.

23. The article of claim 19, wherein the isocyanate-reactive component comprises a hydroxyl, amino, or thiol group.

24. The article of claim 19, wherein the isocyanate-functional component comprises a linear aliphatic diisocyanate.

25. The article of claim 19, wherein the isocyanate-functional component comprises a linear primary diisocyanate.

26. The article of claim 19, wherein the isocyanate-functional component comprises a ring-containing diisocyanate.

27. The article of claim 19, wherein the polymer coating further comprises a tackifier.

28. The article of claim 19, wherein the polymer coating is a pressure sensitive adhesive.

29. The article of claim 19, wherein the diacetylene-containing polymer comprises urethane groups, urea groups, or combinations thereof.

30. The article of claim 19, wherein the diacetylene-containing isocyanate-reactive component is a polyol comprising at least one diacetylene diol.

31. A pressure sensitive adhesive comprising a water-borne diacetylene-containing polymer comprising the reaction product of components comprising:
an isocyanate-reactive component;
a diacetylene-containing isocyanate-reactive component;
an isocyanate-functional component;
a reactive emulsifying compound;
an optional catalyst; and
an optional chain extending agent;
wherein the water-borne diacetylene-containing polymer undergoes a color change upon irradiation to form a polydiacetylene-containing polymer; and wherein the reactive emulsifying compound is represented by Formula (IV):

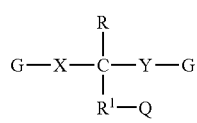
(IV)

wherein:
G is selected from the group consisting of OH, NHR and SH;
Q is a negatively charged moiety selected from COO⁻ and SO₃⁻, or a group that fowls such a negatively charged moiety upon ionization;
each of X, Y and R$^1$ may be the same or different;
X, Y, R, and R$^1$ are independently selected from aliphatic organic radicals free of reactive functional groups having from about 1 to about 20 carbon atoms, and combinations thereof;
R can be hydrogen; and
R$^1$ is optional if Q is COO⁻ and SO₃⁻; or the reactive emulsifying compound is represented by Formula (V):

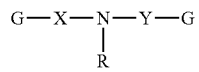
(V)

wherein:
G is selected from the group consisting of OH, NHR and SH;
each of X and Y may be the same or different;
each of X and Y are independently selected from aliphatic organic radicals having from about 1 to about 20 carbon atoms, free of reactive functional groups, and combinations thereof; and
R can be hydrogen or an aliphatic organic radical having from about 1 to about 20 carbon atoms, free of reactive functional groups.

32. The pressure sensitive adhesive of claim 31, wherein the diacetylene-containing polymer comprises urethane groups, urea groups, or combinations thereof 33. The pressure sensitive adhesive of claim 31, wherein the diacetylene-containing isocyanate-reactive component is a polyol comprising at least one diacetylene diol.

34. A pressure sensitive adhesive comprising a polydiacetylene-containing polymer prepared from a water-borne diacetylene-containing polymer, wherein the water-borne diacetylene-containing polymer comprises the reaction product of components comprising:
an isocyanate-reactive component;
a diacetylene-containing isocyanate-reactive component;
an isocyanate-functional component;
a reactive emulsifying compound;
an optional catalyst; and
an optional chain extending agent;
wherein the water-borne diacetylene-containing polymer undergoes a color change upon irradiation to form a polydiacetylene-containing polymer;

wherein the reactive emulsifying compound is represented by Formula (IV):

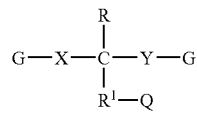
(IV)

wherein:
G is selected from the group consisting of OH, NHR and SH;
Q is a negatively charged moiety selected from COO⁻ and SO₃⁻, or a group that forms such a negatively charged moiety upon ionization;
each of X, Y and R$^1$ may be the same or different;
X, Y, R, and R$^1$ are independently selected from aliphatic organic radicals free of reactive functional groups having from about 1 to about 20 carbon atoms, and combinations thereof;
R can be hydrogen; and
R$^1$ is optional if Q is COO⁻ and SO₃⁻; or the reactive emulsifying compound is represented by Formula (V):

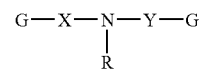
(V)

wherein:
G is selected from the group consisting of OH, NBR and SH;
each of X and Y may be the same or different;
each of X and Y are independently selected from aliphatic organic radicals having from about 1 to about 20 carbon atoms, free of reactive functional groups, and combinations thereof; and
R can be hydrogen or an aliphatic organic radical having from about 1 to about 20 carbon atoms, free of reactive functional groups.

35. The pressure sensitive adhesive of claim 34, wherein the polydiacetylene-containing polymer comprises urethane groups, urea groups, or combinations thereof.

36. The pressure sensitive adhesive of claim 34, wherein the diacetylene-containing isocyanate-reactive component is a polyol comprising at least one diacetylene diol.

37. An article, comprising:
a substrate, and a polymer coating comprising a polydiacetylene-containing polymer at least partially coated on the substrate, wherein the polydiacetylene-containing polymer is prepared from a water-borne diacetylene-containing polymer, wherein the diacetylene-containing polymer comprises the reaction product of components comprising:
an isocyanate-reactive component;
a diacetylene-containing isocyanate-reactive component;
an isocyanate-functional component;
a reactive emulsifying compound;
an optional catalyst; and
an optional chain extending agent;
wherein the water-borne diacetylene-containing polymer undergoes a color change upon irradiation to form the polydiacetylene-containing polymer; and wherein the reactive emulsifying compound is represented by Formula (IV):

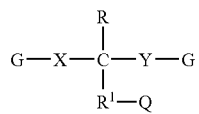 (IV)

wherein:
G is selected from the group consisting of OH, NHR and SH;
Q is a negatively charged moiety selected from COO⁻ and SO₃⁻, or a group that forms such a negatively charged moiety upon ionization;
each of X, Y and $R^1$ may be the same or different;
X, Y, R, and $R^1$ are independently selected from aliphatic organic radicals free of reactive functional groups having from about 1 to about 20 carbon atoms, and combinations thereof;
R can be hydrogen; and
$R^1$ is optional if Q is COO⁻ and SO₃⁻;

or the reactive emulsifying compound is represented by Formula (V):

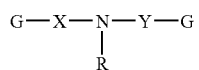 (V)

wherein:
G is selected from the group consisting of OH, NHR and SH;
each of X and Y may be the same or different;
each of X and Y are independently selected from aliphatic organic radicals having from about 1 to about 20 carbon atoms, free of reactive functional groups, and combinations thereof; and
R can be hydrogen or an aliphatic organic radical having from about 1 to about 20 carbon atoms, free of reactive functional groups.

38. The article of claim 37, wherein the polydiacetylene-containing polymer comprises urethane groups, urea groups, or combinations thereof.

39. The article of claim 37, wherein the diacetylene-containing isocyanate-reactive component is a polyol comprising at least one diacetylene diol.

* * * * *

UNITED STATES PATENT AND TRADEMARK OFFICE
CERTIFICATE OF CORRECTION

PATENT NO. : 7,816,472 B2  
APPLICATION NO. : 10/922092  
DATED : October 19, 2010  
INVENTOR(S) : Jeffrey J. Cernhous et al.

Page 1 of 1

It is certified that error appears in the above-identified patent and that said Letters Patent is hereby corrected as shown below:

Column 2,  
Line 61, delete "calorimetric" and insert in place thereof --colorimetric--.

Column 7,  
Line 50, delete "1, 14-diol;" and insert in place thereof --1,14-diol;--.

Column 14,  
Line 55, delete "solventbome" and insert in place thereof --solventborne--.

Column 17,  
Line 48, delete "Part II." and insert in place thereof --Part II:--.

Column 27,  
Line 16, delete "fowls" and insert in place thereof --forms--.  
Line 34, delete "NBR" and insert in place thereof --NHR--.  
Line 48, delete "thereof" and insert in place thereof --thereof.--.

Signed and Sealed this  
Sixth Day of December, 2011

David J. Kappos  
*Director of the United States Patent and Trademark Office*